Figure 1:
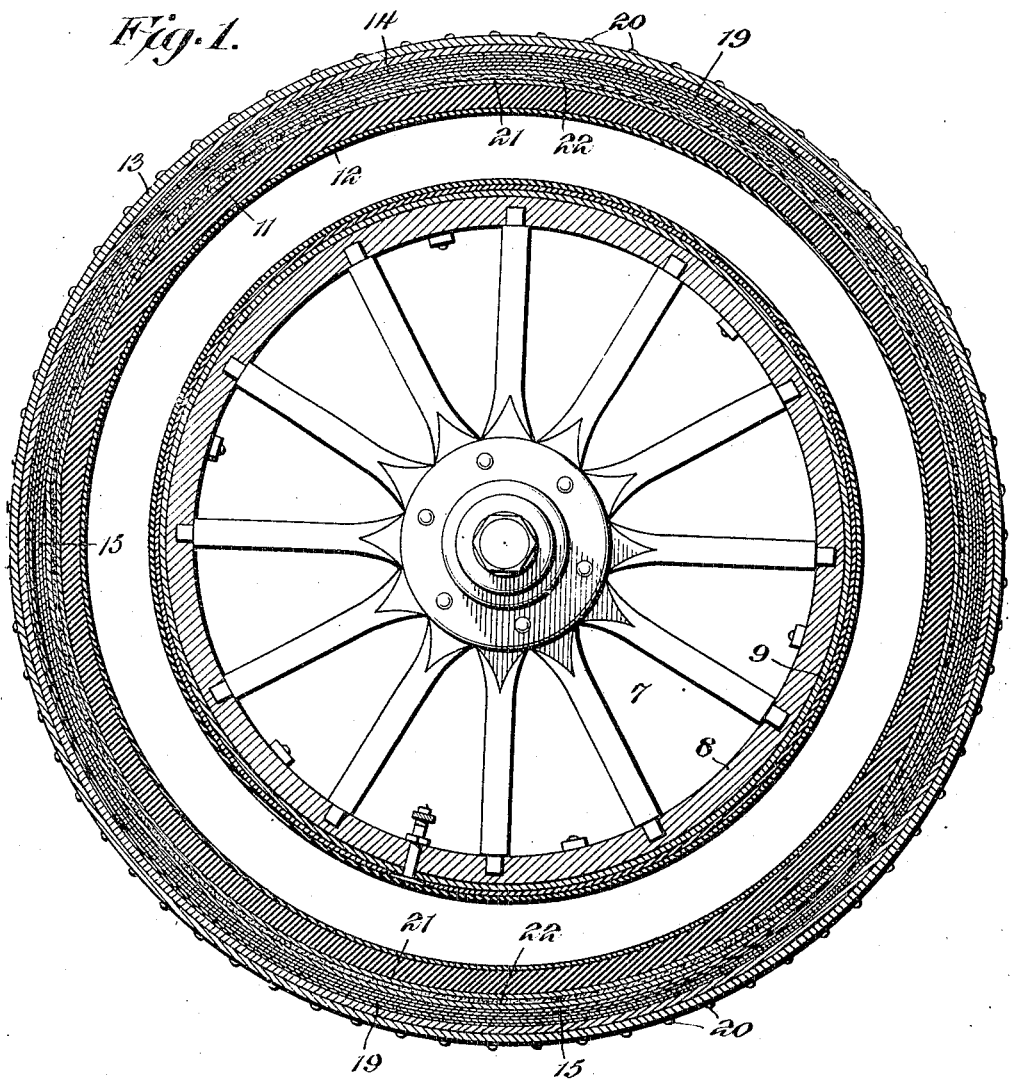

No. 812,259. PATENTED FEB. 13, 1906.
J. E. CAPS.
TIRE PROTECTOR.
APPLICATION FILED JAN. 31, 1905.

2 SHEETS—SHEET 1.

John E. Caps, Inventor,

Witnesses

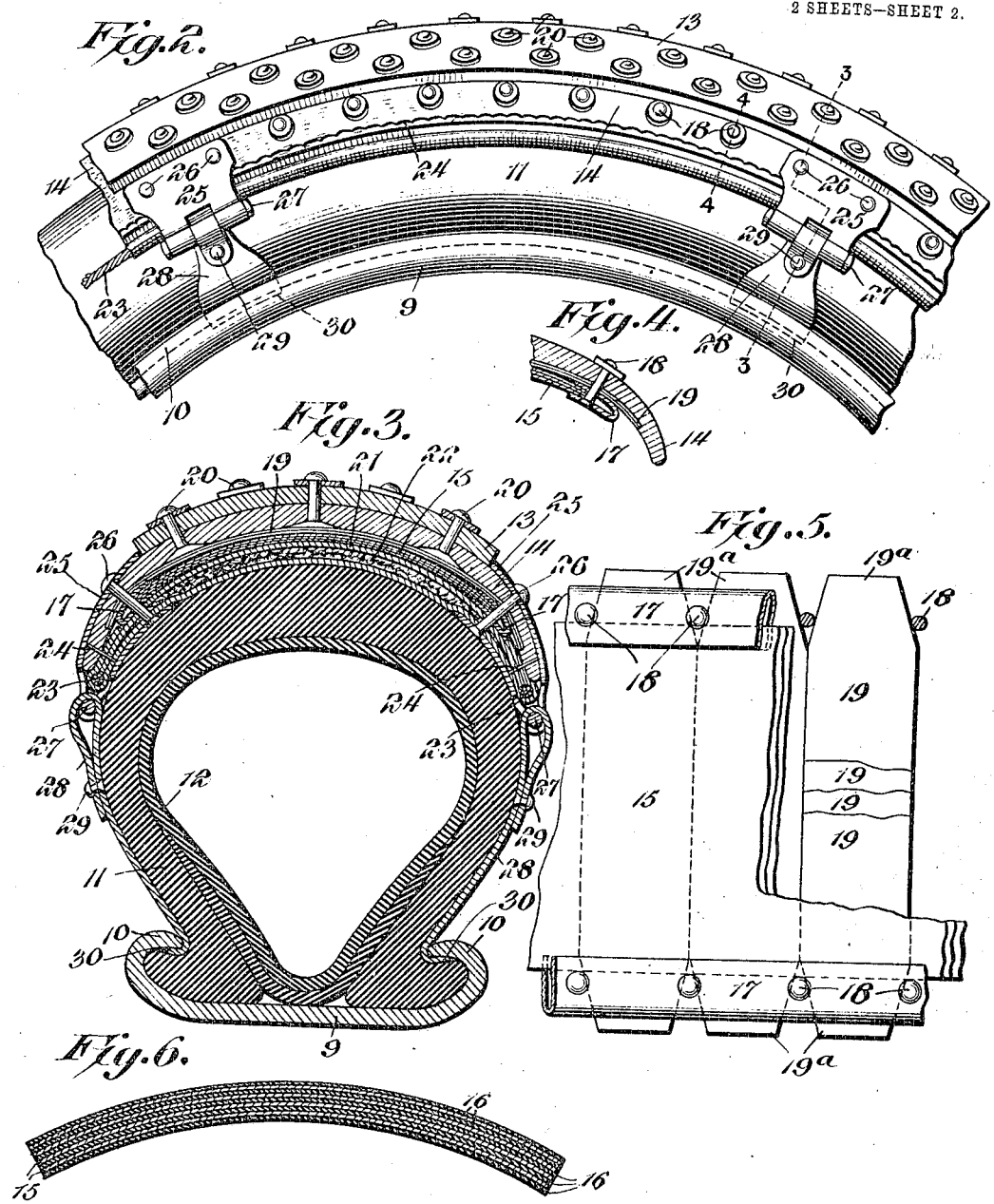

UNITED STATES PATENT OFFICE.

JOHN E. CAPS, OF KANSAS CITY, MISSOURI.

TIRE-PROTECTOR.

No. 812,259.　　　Specification of Letters Patent.　　　Patented Feb. 13, 1906.

Application filed January 31, 1905. Serial No. 243,477.

*To all whom it may concern:*

Be it known that I, JOHN E. CAPS, a citizen of the United States, residing at Kansas City, in the county of Jackson and State of Missouri, have invented a new and useful Tire-Protector, of which the following is a specification.

This invention relates more particularly to improvements in means for protecting the cushion or pneumatic tires of automobiles.

The principal object is to provide novel means of a simple nature which can be readily applied to a tire, will prevent the same slipping or skidding on smooth surfaces, will protect said tire against being punctured, will avoid injury to the tire from chafing or heating of the same, and will not materially interfere with its resiliency.

An embodiment of the invention that is at present considered preferable is illustrated in the accompanying drawings and is described in the following specification. An inspection of the claims hereto appended will clearly indicate that said invention is not limited solely to the structure hereinafter particularly set forth.

In the drawings, Figure 1 is a sectional view through a wheel and tire having the improved protector applied to the latter. Fig. 2 is a side elevation of a portion of the same. Fig. 3 is a cross-sectional view on an enlarged scale. Fig. 4 is a detail sectional view taken on the line 4 4 of Fig. 2. Fig. 5 is a detail view showing portions of the puncture-resisting member and the scales in elevation. Fig. 6 is an enlarged cross-sectional view through the puncture-resisting member and exaggerated to show the waterproof coatings for the layers.

Similar reference-numerals designate corresponding parts in all the figures of the drawings.

In the embodiment illustrated the wheel is designated generally by the reference-numeral 7 and is of any well-known form or construction, having in the present embodiment a felly 8, carrying an annular rim 9, that is provided with inwardly-turned flanges 10. A tire located in the channel in the rim consists of an outer casing 11 of suitable structure and configuration having a pneumatic tube 12 therein. These elements in themselves constitute no part of the present invention and may be changed as desired, the said invention relating to the protector or shield shown upon the outer face of the tire. This shield is preferably constructed as follows: An outer wearing-shoe is employed consisting of sections 13 and 14, the former being somewhat narrower than the latter and being disposed centrally therein. Inside the inner section is located a puncture-resisting member, which is preferably formed of a single sheet of resilient puncture-proof material, such as steel, that is wound or wrapped in a plurality of overlapping layers or convolutions. This member is designated 15, and the continuous formation thereof is shown in Fig. 1. The opposite faces of the sheet metal or strip are coated with suitable resilient waterproof material 16, shown in exaggerated form in Fig. 6, which material serves to prevent the rusting of the metal and at the same time assists in affording resiliency to the protector or guard. The margins of the said member are embraced by binding-strips 17, bent over the same, as shown in Figs. 3 and 4. The member is secured to the shoe by rivets 18, that pass through the section 14 and through the binding-strips 17, these rivets preferably projecting beyond the shoe and constituting means for preventing the slipping of the wheel upon a smooth pavement. Interposed between the shoe and puncture-resisting member are transverse scales 19, also formed of sheet metal, extending transversely of the shoe and member and having tapered ends 19ª, that fit between the holding-rivets 18. The shoe-sections 13 and 14 are fastened together by means of rivets 20, passing through said sections, projecting at their outer ends beyond the shoe and forming antislipping means, their inner ends terminating at the scales.

A very important feature of the invention resides in the lining for the protector, which has heat-insulated properties, this lining consisting of a casing of suitable flexible and preferably textile material (designated 21) and having arranged therein a body of granulated cork 22, preferably glued to the outer side wall of said lining. The margins of the lining surround binding-cables 23, that extend longitudinally around the edges of the protector and constitute means for holding the same upon a tire. The lining is fastened to the margin of the protector by means of lines of stitching 24, which pass through the same inside the cables and also through the outer margins of the shoe-section 14.

The cables 23 would under ordinary circumstances be sufficient to hold the protector in place; but for harder use additional means may be and preferably is employed. This means consists of separate doubled straps forming hinge-ears 25, that embrace the margins of the protector and terminate at the shoe-section 13, being secured in place by rivets 26, that pass through the opposite portions of said ears, through the shoe-section 14, the binding-strips 17, and the lining, thus securely binding these various elements together. Pivoted to the ears 25 by means of suitable pintles 27, passing through the projecting doubled portions of the straps, are other ears 28, each consisting of a plate having a terminal that is turned about the pintle and riveted to itself, as shown at 29, the free end of said plate having an outturned hook 30, that engages under one of the rim-flanges 10.

The protector as herein set forth can be readily applied to practically any well-known form of tire, will prevent the same becoming punctured, will hold the wheel from slipping, and will avoid injury to the tire from chafing or heating, as the lining constitutes a non-conductor of heat and is interposed between said tire and the main body of the protector. The employment of a plurality of thin layers of metal interspersed with waterproof elastic material is considered to be a particularly valuable feature for the reason that the desired resiliency is maintained in connection with the puncture-proof material. Furthermore, the protector can be made comparatively light because of this peculiar combination. Moreover, this protector is resilient, so that it will yield practically the same as the tire itself, the metal sheets or layers therein being extremely thin and necessarily exaggerated in the drawings in order to illustrate the same.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a tire-protector, a yielding body, and a puncture-resisting member located therein and comprising a strip of resilient material extending longitudinally through the body and disposed in a plurality of overlapping convolutions.

2. In a tire-protector, a yielding body having an outer shoe comprising sections, rivets connecting the sections and constituting antislipping devices, and a puncture-resisting member located inside the shoe and comprising a strip of resilient sheet metal extending longitudinally through the body in a plurality of overlapping convolutions.

3. In a tire-protector, a yielding body, a puncture-resisting member located in and covered by the body and consisting of a plurality of layers, bindings embracing the edges of the layers, a lining located inside the member, and means for fastening the protector upon a tire.

4. In a tire-protector, a yielding body, a puncture-resisting member located in the body and constituting a plurality of layers, bindings embracing the edges of the layers, and fastening means for securing the member in the body, said means engaging the body and passing through the bindings.

5. In a tire-protector, a yielding body having an outer shoe, a puncture-resisting member located in the body inside the shoe and consisting of a plurality of layers, bindings embracing the edges of the layers, and fastening means for securing the member in the body, said means passing through the bindings and the shoe.

6. In a tire-protector, a yielding body having a shoe comprising sections, a puncture-resisting member comprising a resilient sheet-metal strip wound into a plurality of overlapping convolutions or layers, bindings embracing the margins of the layers, rivets passing through the sections of the shoe and projecting beyond the same to form antislipping means, and rivets passing through the binding and the shoe and projecting beyond the same, said latter rivets also constituting antislipping means.

7. In a tire-protector, a yielding body having a shoe, a metallic puncture-resisting member located inside the shoe, puncture-resisting scales interposed between the member and shoe, a lining located inside the puncture-resisting member, and means for securing the protector over a tire.

8. In a tire-protector, a yielding body having a shoe, a puncture-resisting member located inside the shoe, puncture-resisting scales interposed between the member and shoe, each of said scales extending transversely of said member and shoe and the width of the former, and means for securing the protector over a tire.

9. In a tire-protector, a yielding body having an outer shoe, a puncture-resisting member located inside the shoe, fastening devices for securing the shoe and member together, and scales interposed between the member and shoe and extending transversely thereof, said scales having their terminals located between the fastening devices.

10. In a tire-protector, a yielding body having an outer shoe, a puncture-resisting member located inside the shoe and consisting of a plurality of layers of resilient sheet metal, bindings embracing the margins of the layers, spaced fastening devices extending through the bindings and the shoe, and scales interposed between the shoe and the member and having tapered terminals that engage between the fastening devices.

11. In a tire-protector, a yielding body having an outer shoe comprising sections of flexible material, a metallic puncture-resisting member located inside the shoe, a lining arranged inside the member and fastening devices passing through the shoe and terminating at the metallic member, said devices projecting beyond the shoe to constitute antislipping means, and said metallic member preventing the wearing of the lining by the fastening devices.

12. In a tire-protector, a yielding body having an outer shoe comprising sections, a puncture-resisting member located inside the shoe and comprising superposed layers, bindings covering the margins of the layers, fastening devices passing through the shoe and terminating at the member, and other fastening devices for securing the member and shoe together and passing through the bindings, said devices projecting beyond the shoe to form antislipping means.

13. In a tire-protector, a yielding body having an outer shoe comprising longitudinally-disposed sections, a puncture-resisting member located inside the shoe and comprising a strip of sheet metal wound into a plurality of superposed convolutions, metal binding-strips embracing the margins of the convolutions, a plurality of spaced fastening devices passing through the bindings and through the shoe, transversely-disposed scales interposed between the member and shoe and having their terminals located between said fastening devices, and other fastening devices for securing the shoe-sections together, said devices terminating at the scales and projecting beyond the shoe to constitute antislipping means.

14. In a tire-protector, the combination with a shoe, of means for securing the same upon a tire, a heat-insulating lining located inside the shoe, and puncture-resisting means interposed between the shoe and lining.

15. In a tire-protector, the combination with a shoe, of means for securing the same upon a tire, a metallic puncture-resisting member disposed inside the shoe and a heat-insulating lining located inside the member and having a yielding granular body, said lining being interposed between the member and tire when the protector is in place on said tire.

16. In a tire-protector, the combination with a shoe, an inner heat-insulating lining having a yielding body of granular cork, and an interposed puncture-resisting member comprising yielding metallic layers, of means for attaching the protector to a tire.

17. In a tire-protector, the combination with a shoe, of means for attaching the same upon an ordinary tire, and a heat-insulating lining located inside the shoe and comprising a casing of spaced walls, and a body of granular cork located between said walls.

18. In a tire-protector, the combination with a shoe, of a puncture-resisting member located inside the same, a heat-insulating lining disposed inside the member, means for connecting said several elements, and means for attaching the protector to a tire.

19. In a tire-protector, the combination with a shoe, of a resilient sheet-metal puncture-resisting member arranged inside the same and formed of a strip having overlapping convolutions, means for securing the shoe and member together, a casing located inside the member, a body of granular cork arranged in the casing, and means for securing the casing and shoe together.

20. In a tire-protector, the combination with a yielding body having puncture-resisting means, of hinge-ears comprising doubled straps embracing the margins of the body and projecting therefrom, and other ears hinged to the projecting portions of said first-mentioned ears and carrying rim-engaging hooks.

21. In a tire-protector, the combination with a puncture-resisting metal strip, of a resilient coating of waterproof material covering the strip, and a body inclosing the strip and coating, and including an outer shoe, and means for attaching the protector to a tire.

22. In a tire-protector, the combination with a member comprising a plurality of puncture-resisting layers of thin metal, of resilient waterproof material covering said layers, a lining covering the inner side of the member, a shoe covering the outer side of said member, and means for securing the protector over a tire.

23. In a tire-protector, the combination with a body partially circular in cross-section, of a plurality of puncture-resisting layers formed of thin sheet metal, and layers of resilient waterproof material interposed between the puncture-receiving layers, the whole being inclosed by said body, and means for securing the said protector upon a tire.

In testimony that I claim the foregoing as my own I have hereto affixed my signature in the presence of two witnesses.

JOHN E. CAPS.

Witnesses:
 EDWIN E. WILSON,
 N. B. VALIN.